United States Patent
Vande Berg

[11] Patent Number: 5,949,031
[45] Date of Patent: Sep. 7, 1999

[54] COMBINATION SCALE FOR CONVEYOR LINE

[75] Inventor: David M. Vande Berg, Sioux Center, Iowa

[73] Assignee: VBS, Inc., Sioux Center, Iowa

[21] Appl. No.: 08/934,601

[22] Filed: Sep. 22, 1997

[51] Int. Cl.[6] ............ G01G 11/14; G01G 19/40
[52] U.S. Cl. ................................ 177/16; 177/17
[58] Field of Search ............... 177/16, 17, 119, 177/123, 145

[56] References Cited

U.S. PATENT DOCUMENTS

| | | | |
|---|---|---|---|
| 4,418,773 | 12/1983 | Finet et al. | 177/16 |
| 5,119,893 | 6/1992 | Jost | 177/16 |
| 5,359,154 | 10/1994 | Tsukasa et al. | 177/145 |
| 5,635,679 | 6/1997 | Kohashi et al. | 177/145 |
| 5,736,682 | 4/1998 | Heitmann et al. | 177/16 |

*Primary Examiner*—Randy W. Gibson

[57] ABSTRACT

A scale system for the continuous weighing of a series of packages on a conveyor. The packages are run over a series of synchronized belts on tables, one of which records the weight on a section of the conveyor at intervals timed to assure that no single package will be weighed more than once.

6 Claims, 2 Drawing Sheets

COMBINATION SCALE FOR CONVEYOR LINE

BACKGROUND AND SUMMARY OF THE INVENTION

This invention pertains to weighing devices specifically designed to weigh discrete pieces carried on a continuous delivery system such as a belt. As an example, it might be desired to have the aggregate weight of a series of packages or pieces of meat or other products carried by a belt.

There have been attempts to arrive at such aggregate weights by separating the belt-load into separate batches and weighing each batch. Generally that type of system requires at least one attendant to be sure that spacing of an entire batch, and no more is on the scale at any one time. Thus, it is required that the flow of packages onto the scale be at least momentarily stopped so that no piece will be partially on or partially off the scale when the weight is recorded. The attendant is necessary to space the margins of the scale platform with each weight cycle.

By the present invention, a weighing device is provided at which no attendant is required for spacing of packages on the scale. Weights are taken so that if one partial component of weight is measured on the first pass over the scale, the rest of the weight will be recorded on the next pass. Thus, the need for a constant presence of an attendant is eliminated.

DESCRIPTION

Figure 1:
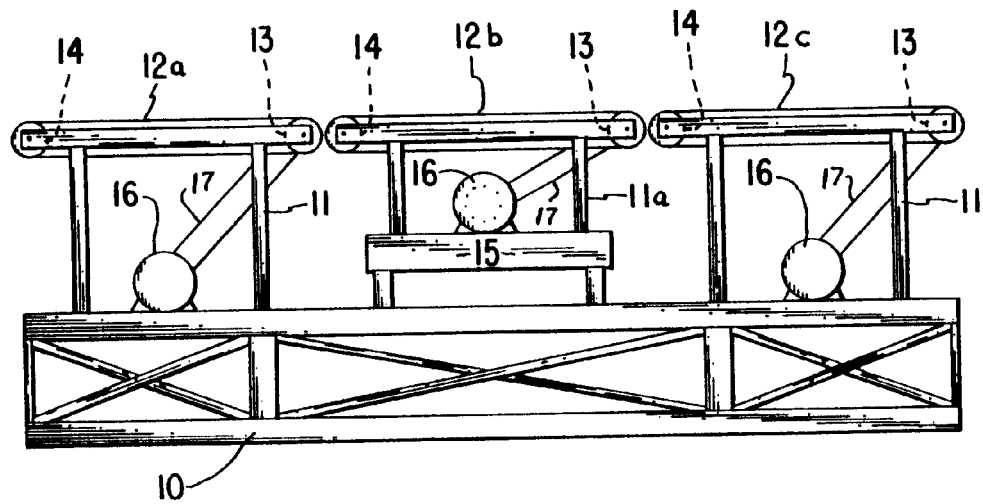
FIG. 1 is a side elevational view of the weighing system for larger discrete articles.

Briefly this invention pertains to weighing devices for weighing a substantial number of discrete articles of similar nature. The system is designed to be placed in a conveyor belt route delivering cuts of meat or similar discrete packages where any package may be of slightly different weight from the other, but where the overall weight of all is the desired result of the weighing.

More specifically, and referring to the drawings, the system includes a series of the units to be inserted into the continuing path of a conveyor system. Each unit consists of a base 10 upon which is mounted a simple frame 11 supporting a separate belt unit comprising a belt 12 engaged on a pair of rollers including one driven roller 13 and one idler 14. Each belt 12 must end close enough to the start of the next belt so that the flow of packages is continuous particularly where those packages are of different sizes. That same condition must exist at the entrance and exit from the system.

Equally, the rate of lineal speed of the belts 12 must be synchronized so that the flow across the three parts of the system is even and without blockage of the flow.

The need for this synchronization can best be understood by realizing the function of the system. If the contents of the delivery system (belt) is envisioned as a continuous although not necessarily uniform stream of packages, then a division of those packages into a continuous series of units which can be weighed individually leads to a total weight as those individual units are totalled. However, in order for that total to be accurate, each individual unit must be accurately divided and weighed. Thus, if a unit of flow includes a partial package at its ending, then the remainder of the package must be weighed at the beginning of the next unit in the flow. Thus a precise beginning and end of each unit of flow must be measured.

This is done in the present invention by accurately controlling the speed of the belts and the time interval between recording the weights of each unit. The means by which this desideratum is accomplished will then be described always with the idea in mind of obtaining accurate measurements of weight for each accurately delineated unit of flow in the packages over the belt conveyors.

In practice the entrance and exit conveyor belts 12a and 12c are principally regulating devices adapted to keep the flow over the central or weighing belt 12b uniform. The frame 11 of the two outer belts are simply set on the bases 10 in those locations. However the central weighing belt 12b and its rollers 13 and 14 are mounted on a similar frame 11a which is set on a customary electronic weighing device 15. Such devices are well known in the art and can be electrically actuated to provide an instantaneous reading of the weight at the time of the actuation.

Accuracy, then, depends on the accuracy of the division of the units on the belts. If each particle on the belt is weighed once and only once, then accuracy has been achieved. Two variables determine that division. The first is the speed or at least the traverse of one and only one belt length in the interval between successful actuation of the weighing trigger. The second is the smooth transition onto and off of the belt 12b. All of the design and structure is conceived and designed to that end.

Therefore, as the packages are picked up by the first belt 12a, they are transported at a uniform rate resulting in a smooth transition to the second belt 12b. At that transition, the space between the belts must be small enough so as not to trap a package. In the usual installation that gap should be less than one and one half inches, preferably much less than that. Tests have shown for the usual installation a gap of three-quarters of an inch works very well. To maintain that limit, the line rollers 13 and the idler rollers 14 must be of a diameter of not more than 3¾ inches.

Because of the uniform speed of the belts 12a and 12b, there should be no other interference with the smooth transition onto the belt 12b. Also, because of similar limitations at the exit from that belt to the continuing carrier 12c and from there to the outlet belt (not shown). So long as the entrance and exit from the weighing belt 12b are untrammeled, the weighing process will be accurate.

Figure 2:
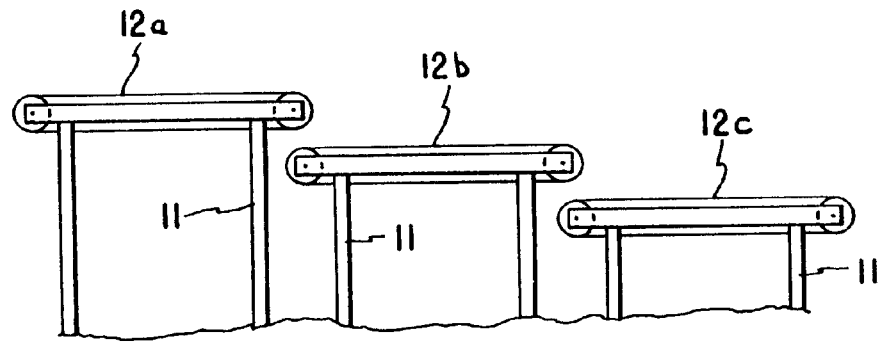
FIG. 2 is a view similar to FIG. 1 of the system adapted for a use with smaller particulate matter.

The alternative arrangement shown in FIG. 2 shows how the scale device can be used for particulate matter of a finer division than most packages. Again, the separation provided by the triple belt arrangement provides added accuracy. The use of a falling product for the first belt 12a to the weighing belt 12b may cause a very slight inaccuracy because of the impact of the falling product onto that belt. However, the need for accuracy is somewhat less with most particulate matter so that such small inaccuracies may be accommodated. The mechanism to guarantee the inclusion on belt 12b of only unweighed material is best shown and illustrated in FIGS. 3–7. The frame 11a is shown diagrammatically and may take a somewhat more sophisticated form although that form does not form any part of the invention.

Figure 3:
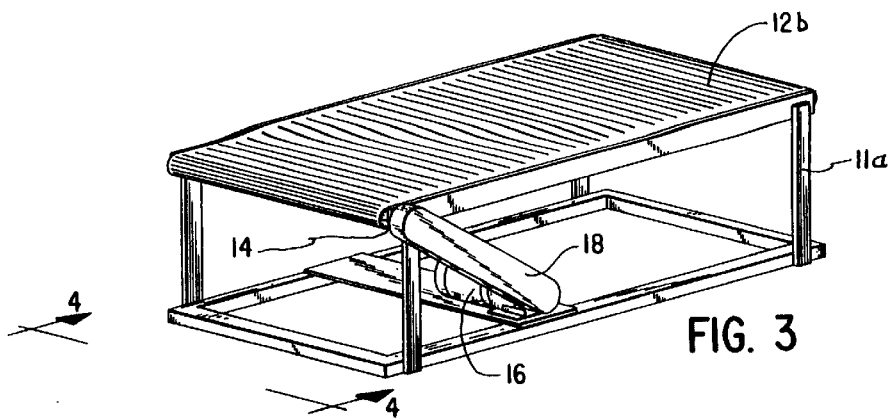
FIG. 3 is a perspective view of one member of the system apart from the system.
Figure 7:
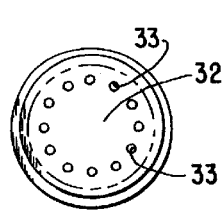
FIG. 7 is a view similar to FIG. 6 of an alternative type of encoder plate.

As noted, each conveyor belt 12 is driven by a motor 16 through a belt 17 or chain. In FIG. 3 this driving device is shown enclosed in a guard 18. The power belt 17 drives a driving roller 14 and the belt which carries the packages as indicated above.

It has been discovered that most motors, even those operating on a 60 Hertz power source are not accurate enough to accomplish the spacing desired for the proper weighing of the product going over the scale. Therefore, a special system is provided on the motor to ensure that the transport across the belt 12b is always the same. This system and a modification are shown in FIGS. 4–7.

The motor drive 20 is designed to be mounted on the frame 11 by means of a base 21. Each motor 20 drives a shaft 22 which causes a sprocket or pulley or the like to transmit motion to each of the belts 20a, 20b, and 20c in the customary way. Opposite the shaft a cooling fan may be provided in a housing 23 as is customary.

Figure 6:
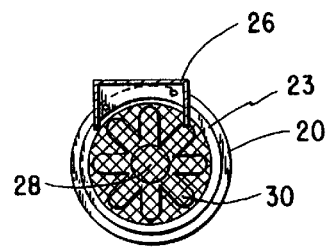
FIG. 6 is a view from line 6—6 of FIG. 4.
Figure 5:
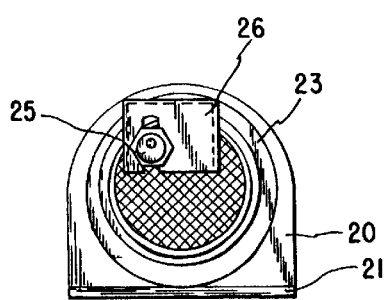
FIG. 5 is an end elevational view of the motor of FIG. 4
Figure 4:
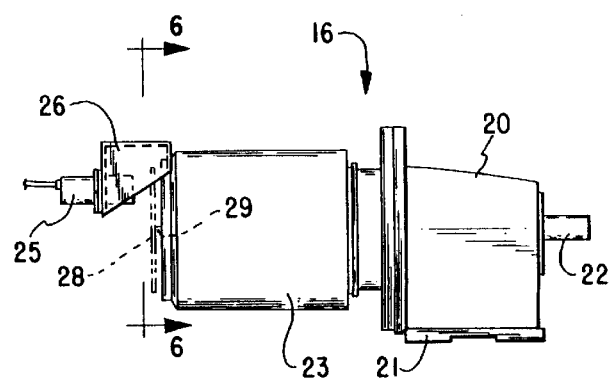
FIG. 4 is an elevational view of the operating motor from line 4—4 of FIG. 3.

Beyond the housing 23, applicant provides a system by which the rotations of the shaft may be counted. In FIGS. 4, 5 and 6, applicant has illustrated one possible system. That system includes a unit 25 supported by a bracket 26 from the shell 23 of the motor. The unit 25 may include both a source of light and a receptor spaced apart so as to allow the receptor to receive reflected impulses of light from the source. In order to provide the impulses of reflected light, a plate 28 fixed to an extension 29 of the shaft 22 is rotated by that shaft. A plurality of vanes 30 is formed on the plate 28. Each vane 30 is adapted to reflect a beam of light as the vane 30 passes the source. Thus the rotation of the motor and therefore of the plate 28 creates impulses of light which can be counted by the receptor part of the unit 25.

By calibrating the passage of the belt once across the top of the frame against the total number of impulses, a valid measure of a single passage can be obtained. Thus, because it is desired to make a record of each single passage of the belt 12b, and that such passage must be accurately measured, it is obvious that a system—electronic preferably—can be used to trigger a weight record from the weighing device 15 each time the number of impulses reaches the calibrated number. In that way accurate total weight can be accumulated while the packages are being carried by the belt.

It will be obvious that there are other impulse generating systems which can be used instead of the plate 28 with fingers 30. As an example still using an optical system, a plate 32 perforated by holes 33 (FIG. 7) could be used to generate the impulses to trigger the weighing impulse. In this type of system, a U shaped support would bracket the plate 32 so that a light source or one side of the plate would be aimed at a receptor on the opposite side. Thus the holes 33 would provide the impulses.

It is apparent that by this system, an accurate total weight of a batch of packages or a series of batches of packages can be arrived at. The system may be particularly useful in weighing cuts of meat either of a single type (hams, loins or the like) or of a variety of types of cut—say from a single animal to determine the yield of useful meat compared to live weight. However, the system is not limited to such types of packages and may be used with a variety of other industries when a total weight of a series of packages is of interest.

I claim as my invention:

1. A system for weighing a series of packages on a line of conveyor belt comprising at least two discrete sections of belt inserted into said line, drive means for driving said sections of belt at the same speed, a first of said section being adapted to remove said packages and deliver them at said same speed to a second of said sections, a weighing device connected to said second of said sections adapted to register the weight of said packages, and means calibrated for activating said weighing device at intervals equal to the passage of one length of said section of belt for weighing only the packages on said second section at intervals of the passage of said section.

2. The system of claim 1 in which a third discrete section is inserted in said line of conveyor belt in a position to receive said packages from said second section, the speed of said third section also being the same as that of said first and second sections.

3. The system of claim 2 in which each discrete section of belt is driven by a separate motor, the second motor being connected drivingly to the second belt section, said second motor being a part of said means for activating said weighing device.

4. The system of claim 3 in which said second motor has an extended shaft a, plate-like device on said extended shaft and rotatably driven by said motor, said plate-like device being interrupted at regular intervals, timing mechanism arranged to record passage of said intervals so as to count the passage of said intervals, the count of said intervals being effective to operate said means for actuating said weighing device.

5. The system of claim 4 in which said plate-like device is formed with fingers to provide the interruption at regular intervals.

6. The system of claim 4 in which said plate-like device is punctured by holes spaced at regular spacing to provide the interruptions at regular intervals.

* * * * *